United States Patent Office 3,641,172
Patented Feb. 8, 1972

3,641,172
PROCESS FOR PREPARING 1,2-DICHLORO-
ETHANE
Morris A. Johnson and Kang Yang, Ponca City, Okla.,
assignors to Continental Oil Company, Ponca City,
Okla.
No Drawing. Filed Apr. 21, 1969, Ser. No. 818,147
Int. Cl. C07c 17/20
U.S. Cl. 260—658 R                              6 Claims

ABSTRACT OF THE DISCLOSURE

Quaternary ammonium salts and quaternary phosphonium salts are disclosed as catalyzing agents for improving the reaction between 1,2-dibromoethane and an alkali metal chloride or ammonium chloride for producing 1,2-dichloroethane and an alkali metal bromide or ammonium bromide.

BACKGROUND OF THE INVENTION

Field of invention

This invention relates to the reaction of 1,2-dibromoethane and an alkali metal chloride or ammonium chloride to produce 1,2-dichloroethane and an alkali metal bromide or ammonium bromide.

Description of prior art

It has long been known, Compte Rendus 130, 1191 (1900), that aluminum bromide reacts readily with chlorinated aliphatic hydrocarbons to replace chlorine atoms of the latter with bromine, and certain methods have been proposed for applying the reaction in the manufacture of brominated aliphatic compounds. However, the known methods for carrying out the reaction all involve serious disadvantages.

The reaction requires use of a considerable amount of aluminum bromide which is difficult to prepare, store, and handle in powdered form due to the readiness with which it deteriorates under action of moisture of the air. Also, in the reaction of aluminum bromide with a chlorinated hydrocarbon a thick aluminum chloride-containing sludge is formed which renders stirring of the mixture difficult and necessitates operation in a batchwise manner so as periodically to remove the sludge. Harlow et al. U.S. Pat. No. 1,891,415 disclose a method wherein bromine is reacted with aluminum in a closed system to form molten aluminum bromide, and the latter is fed directly into reaction with a chlorinated hydrocarbon to form a brominated organic product. This method avoids the difficulties earlier encountered in preparing and handling powdered aluminum bromide, but it does not avoid sludge formation during the reaction of the aluminum bromide with the chlorinated hydrocarbon. Nutting et al. U.S. Pat. No. 2,120,675 have shown that the troublesome sludge formation may be avoided by first dissolving the aluminum bromide in an inert solvent such as ethyl bromide, and feeding the solution into reaction with the chlorinated aliphatic hydrocarbon. The large proportion of inert solvent which is employed reduces, of course, the productive capacity of a reactor of given size and the presence of the solvent necessitates extra steps of removing the aluminum compounds dissolved in the reacted mixture and of separating and recovering the solvent. When using aluminum bromide as a reactant in accordance with any of the known methods just discussed, the reaction tends to stop far short of complete consumption of one or both reactants, presumably because of a chemical equilibrium between the reactants and the products.

Lake et al. U.S. Pat. No. 2,553,518 disclose that halides of aluminum and boron are effective catalysts in the reaction between hydrogen bromide and certain chlorinated organic compounds to replace chlorine of the latter with bromine atoms, and thereby produce brominated organic compounds. Also, the preparation of alkyl iodide from the corresponding chloride by nucleophilic substitution using acetone as a solvent is well known (see "Organic Chemistry," L. F. Fieser and M. Fieser, D.C. Heath and Co., Boston, 1944). In this acetone solvent, however, the chloride ion-bromide ion exchange reaction cannot be carried out with a reasonable rate because bromide salts are nearly insoluble in acetone.

The reaction $RX + X'^- \rightleftharpoons RX' + X^-$ is well known (see J. Hine, Physical Organic Chemistry, 2nd ed., McGraw-Hill, New York, 1962, Chapter 6). Equilibrium varies with R, X, temperature, and solvent system, but in order to achieve a useful conversion from one alkyl halide to another, equilibrium should be shifted to the right by reducing [RX'], [X$^-$], or both. This is commonly accomplished by removing X$^-$ from the reaction mixture as a nearly insoluble metal salt.

SUMMARY OF THE INVENTION

According to this invention quaternary ammonium salts or quaternary phosphonium salts are utilized to catalyze the reatcion between 1,2-dibromoethane and an alkali metal chloride or ammonium chloride to produce 1,2-dichloroethane and alkali metal bromide or ammonium bromide.

DETAILED DESCRIPTION

The object of this invention is to convert 1,2-dibromoethane to 1,2-dichloroethane and an alkali metal bromide or ammonium bromide using an alkali metal chloride or ammonium chloride.

Equilibrium studies were made by mixing and heating 1,2-dibromoethane and sodium chloride in an aqueous system. It was determined that equilibrium for the two-step conversion

gives a mixture of $BrCH_2CH_2Br$, $BrCH_2CH_2Cl$, and $ClCH_2CH_2Cl$. Fortuitous combinations of boiling points and an azeotrope of the 1,2-dichloroethane and water made it possible to separate the desired 1,2-dichloroethane from the other two alkyl-dihalides.

In theory on equilibrium mixture of the alkyldihalide and an excess chloride ion could allow forcing of the reaction to near completion by continuous fractional distillation of 1,2-dichloroethane. In practice, the rates of $k_{1f}$ and $k_{2f}$ must be sufficiently great to allow 1,2-dichloroethane distillation and to maintain column equilibrium. Thus in water, where the alkyl dihalides are quite insoluble, the reaction does not proceed fast enough to maintain distillation separation of sufficiently pure 1,2-dichloroethane.

It was unexpectedly discovered that in the presence of quaternary ammonium and phosphonium salts aqueous sodium chloride and 1,2-dibromoethane gave sufficiently rapid conversion to 1,2-dichloroethane that the product could be removed in essentially pure condition in 8 to 18 hours by fractional distillation.

Use of the quaternary ammonium salt resulted in recovery of essentially pure 1,2-dichloroethane with a yield of about 85 percent. The quaternary phosphonium salt resulted in nearly quantitative recovery of alkyl-dihalides, with 90 percent production of 1,2-dichloroethane.

The preferred quaternary salts for use in this invention have the formula

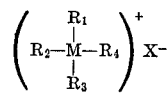

where M is nitrogen or phosphorus, X is chlorine or bromine, and $R_1$, $R_2$, $R_3$, and $R_4$ are monovalent alkyl radicals where the total number of carbon atoms in $R_1$, $R_2$, $R_3$, and $R_4$ should be at least 18 and is preferably from about 20 to about 40, with the further limitation that no more than one R group can contain more than 10 carbon atoms.

Some examples of suitable quaternary compounds are: hexadecyltrihexylammonium bromide; trioctylethylammonium bromide; tridecylmethylammonium chloride; didodecyldimethylammonium chloride; dioctadecyldimethylammonium chloride; tributyldecylphosphonium chloride; tributylhexadecylphosphonium chloride; methyltricaproylylammonium chloride, and tributyloctadecylphosphonium bromide. Also included are the above compounds where the halide is bromine or chlorine.

The concentration of said quaternary salt in said system should be from about 0.5 to about 5 percent by weight and preferably about 1 percent.

The following examples illustrate the improvement in the reaction by utilizing the process of this invention. In each of the following examples, unless otherwise indicated, all distillations were performed on a two-foot column with 15 mm. diameter packed with ⅛ in. I.D. glass helices. All temperatures reported are uncorrected. Unless otherwise specified, head temperature was 74–76° C., which gave an azeotrope of 1,2-dichloroethane-water. The product was separated from water and analyzed by direct comparison of g.l.p.c. peak height using an authentic sample of 1,2-dichloroethane on carbowax at 162° C. Unless otherwise indicated, only 1,2-dichloroethane and 1-bromo-2-chloroethane were detected. Percentage values are mole percent.

EXAMPLE I

A mixture of 100 g. water, 60 g. sodium chloride, and 20 g. 1,2-dibromoethane was magnetically stirred for 22 hours at 60° C. The reaction mixture was cooled, filtered, and washed with two 25 ml. portions of n-hexane. The aqueous phase was extracted with three 25 ml. portions of n-hexane. The combined hexane solutions contained a trace of 1,2-dichloroethane, some 1-bromo-2-chloroethane, and most 1,2-dibromoethane.

EXAMPLE II

A mixture of 100 g. water, 40 g. sodium chloride, 20 g. 1,2-dibromoethane, and 1.00 g. tributyloctadecyl phosphonium bromide was stirred at 65° C. for 20 hours, cooled, and the organic phase separated. Analysis showed approximately 70 percent 1,2-dichloroethane, 25 percent 1-bromo-2-chloroethane, and a trace of 1,2-dibromoethane.

EXAMPLE III

A reaction mixture of 20 g. water, 5.0 g. sodium chloride, 5.0 g. 1,2-dibromoethane, was partially distilled as above in 30 minutes to give no 1,2-dichloroethane, some 1-bromo-2-chloroethane, and most 1,2-dibromoethane. A 24-hour slow continuation of the above distillation gives some 1,2-dichloroethane, more 1-bromo-2-chloroethane, and most 1,2-dibromoethane.

EXAMPLE IV

A mixture of 20 g. of water, 13 g. sodium chloride, 5.0 g. 1,2-dibromoethane, and 1 drop methyltricaprylyl ammonium chloride, was refluxed for about 30 minutes, then slowly distilled. The products recovered consisted of about 30 percent 1,2-dichloroethane, appreciably more 1-bromo-2-chloroethane, and a small amount of 1,2-dibromoethane.

EXAMPLE V

A mixture of 1000 ml. water, 500 g. sodium chloride, 250 g. 1,2-dibromoethane, and 10 ml. methyltricaproylyl ammonium chloride was refluxed with magnetic stirring for 2 hours. Product was distilled from the reaction mixture over a 14-hour period, to give 114 g. which was 99 percent pure 1,2-dichloroethane (overall yield 85 percent).

EXAMPLE VI

A mixture of 1000 ml. water, 500 g. sodium chloride, 251 g. 1,2-dibromoethane, and 10.00 g. tributyloctadecyl phosphonium bromide was refluxed with magnetic stirring for 30 minutes and distilled in 9 hours to give 131 g. which was 92 percent pure 1,2-dichloroethane (92 percent yield).

There are many known uses for the product 1,2-dichloroethane. This product has been used as a solvent for lacquers; as an extractive for fats and oils; as a spotting agent for removal of tar, paint, etc. from textiles; as an insecticidal fumigant for foodstuffs; and many other uses known to those skilled in the art.

Having thus described the invention by providing specific examples thereof, it is to be understood that no undue limitations or restrictions are to be drawn by reason thereof and that many modifications and variations are within the scope of the invention.

What is claimed is:

1. In the process for preparing 1,2-dichloroethane and an alkali metal bromide or ammonium bromide by reacting 1,2-dibromoethane with an alkali metal chloride or ammonium chloride in a heated aqueous system, the improvement which comprises adding from about 0.5 to about 5 percent by weight of a quaternary ammonium salt or quaternary phosphonium salt as catalyst to said system, said salt having the formula

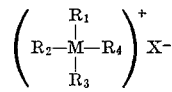

where M is nitrogen or phosphorus, X is chlorine or bromine, and $R_1$, $R_2$, $R_3$, and $R_4$ are monovalent alkyl radicals where the total number of carbon atoms in $R_1$, $R_2$, $R_3$, and $R_4$ is from about 18 to about 40, with the further limitation that no more than one R group can contain more than 10 carbon atoms.

2. The improvement of claim 1 wherein said salt is methyltricaproylyl ammonium chloride.

3. The improvement of claim 1 wherein said salt is tributyloctadecyl phosphonium bromide.

4. The process of claim 1 wherein said alkali metal chloride is sodium chloride.

5. The improvement of claim 1 wherein said salt is present in a concentration of about 1 percent by weight.

6. The improvement of claim 1 wherein the total number of carbon atoms in $R_1$, $R_2$, $R_3$, and $R_4$ is from about 20 to about 40.

References Cited

UNITED STATES PATENTS 3,410,917  11/1968  Louw _____ 260—658 R

LEON ZITVER, Primary Examiner

A. M. SIEGEL, Assistant Examiner